3,005,740
PRE-TREATMENT METHOD AND COMPOSITION FOR IMPROVING THE ADHESIVE QUALITIES OF RUBBER
John J. Halko, Sr., 1058A 5th Ave. S., Airport Villa, Del.
No Drawing. Filed Sept. 29, 1958, Ser. No. 763,790
7 Claims. (Cl. 156—95)

This invention relates to the cementing or welding of rubber surfaces to each other and more particularly to the cementing of rubber patches on tires or on other articles made of rubber.

As is well known, it is customary to repair articles made of rubber which have become defective in spots, especially articles which are inflated and which have to withstand internal pressure, such as inner tubes of automobile tires, tubeless automobile tires, and the like, by cementing a rubber patch on the surface surrounding the defective portion. If the size of the patch is correctly selected and if a perfect bond between the patch and the article to be repaired is obtained, the reinforced surface can take the same pressure and stand the same wear as the original article.

To properly cement a rubber patch on the surface to be repaired, it has been necessary, as a first step, to scrape the surface, as with emery paper or sandpaper or to brush the surface to be repaired energetically with a wire brush or the like, in order to roughen the surface and the entire area to which the cement has to be applied. The roughening operation for preparing the surface is carried out mechanically, and has been considered indispensable. To be effective, this prior treatment must be performed to such an extent that it removes from the rubber the entire surface layer which was exposed to air and to such foreign materials as talcum powder or the like.

The above-mentioned known method of preparing the rubber surface for the cementing on it of a rubber sheet or patch by scraping is effective, but it also requires considerable attention, as imperfect removal of the outermost surface layer results in an imperfect bond with the applied sheet or patch, while on the other hand the overdoing of the roughening may easily lead to a damage of the rubber article, especially if such article is thin walled. Also in order to perform such an operation the article must be properly supported to permit the application of the necessary mechanical forces, and the surface exposed sufficiently to allow the manipulation of the roughening tools. A surface treated mechanically is furthermore not well circumscribed and repeated mechanical scraping of a thin walled rubber article such as will occur in connection with defects of the surface in the same general area, leads to a weakening of a wall portion that may be too close to a previous patch so that it will not be suitable for receiving another patch.

Among the objects of the present invention is a method of preparing the rubber surface that uses little or no mechanical preparations. Additional objects of the present invention include novel compositions for use in such method. These as well as other objects of this invention will be more completely appreciated from the following description of several of its exemplifications.

According to the present invention a rubber surface is prepared for cementing by merely applying a composition which is liquid and then waiting a few moments for the liquid to evaporate. The liquid is one which has a pronounced swelling action on the rubber, and a good example of such a liquid is a mixture of a major amount of xylol, and minor amounts of carbon tetrachloride, carbon disulfide and Chlorothene.

Chlorothene is the registered trademark (No. 625,614 registered April 17, 1956), of the Dow Chemical Company, for 1,1,1-trichloroethane which is available in inhibited or uninhibited form. Inhibitors such as 1,4-dioxane by itself or in mixtures with an alcohol like 2-methyl-3-butyn-1-ol, are generally added to 1,1,1-trichloroethane in a concentration of about 5% or less to reduce its decomposition when in contact with metal. U.S. Patent 2,811,252, granted October 29, 1957, gives several such examples.

For the purposes of the present invention any 1,1,1-trichloroethane used can be inhibited or uninhibited.

The composition of the invention is applied in very small quantities so that it is sufficient to dab the surface to be treated with a cloth which has been moistened in the liquid or to apply the liquid by means of an applicator pad which has been previously moistened. The use of such applicator pads in connection with patches of suitable standard dimensions will simplify and expedite the whole process.

The composition is useful with all types of rubber and when referring to rubber in the above description and in the claims, it is intended to refer not only to natural rubber but also to synthetic rubber, such as butyl rubber or neoprene, and to so-called live rubber as well as to other types of synthetic rubber.

The treatment leads to a perfect cementing bond without exception if carried out properly, even in the absence of any mechanical roughening. In some cases the rubber to be patched may have a protuberance such as a flashing rib that abruptly rises from the surface and makes it impossible to have the patch seal against the abrupt configuration. If the patch must be applied to this location, it is advisable to buff the protuberance so as to eliminate the abruptness.

To apply a patch in accordance with the present invention, the above composition is poured, dabbed or spread by means of a moistened pad or the like in sufficient quantity on an area of the surface slightly larger than the patch or sheet to be bonded to it. The applied liquid is then substantially completely evaporated, as by leaving the wet surface exposed to the air for about a half minute. The surface then looks dry, and is ready for cementing and patching. The rubber solvent cement is applied in the usual manner on the surface so treated and the patch then fastened in place.

*Example*

A particularly preferred composition of the present invention has the proportions by weight indicated below:

| | Percent |
|---|---|
| Xylol | 80 |
| Carbon tetrachloride | 18 |
| Chlorothene | 1.5 |
| Carbon disulfide | 0.5 |
| | 100 |

The xylol can be any of the isomeric xylenes (ortho, meta or para) or mixtures thereof in any proportions, 30% ortho, 35% meta and 35% para, for instance. These compositions work unusually well in the patching of tubeless automobile tires as well as automobile tire tubes that have been punctured.

The proportions of the xylol and the other ingredients can be varied as indicated above. Not much carbon disulfide is used, generally between ¼ and 1% by weight, and is advantageous in improving the adhesion of the patch. The carbon disulfide seems to behave as a vulcanizing improver for the cemented joint so that the patch rapidly becomes vulcanized in place. A damaged automobile inner tube so patched will, when inflated to destruction, not fail in the patched area.

It may be desirable to repeat the pretreatment operation of the present invention before applying the patch, as for example where the surface is particularly dirty.

The described compositions also have a number of further uses. They are highly effective for removing automobile tires from rusty rims. Such a removal is, as well known, sometimes difficult to perform and leads very frequently to damage of the tire. Applying the above compositions to the surfaces so that they work their way to the interface between tire and wheel, makes them very easy to separate.

Further, the compositions are extremely effective in removing calcium chloride or other foreign material from tractor tubes. These materials are readily washed or mopped away in this manner.

The compositions of the present invention can also be used to make a rubber cement that will give acceptable bonding with less preparation of the surface to be bonded. For example, a solution of 4% crude or para rubber in the above formulation gives a cement that can be worked directly into an unprepared rubber surface with a dull knife blade for instance, to give good bonding. The addition of ½% rosin to the rubber solution further improves the bonding. The working in of the cement need only take about half a minute.

The description of typical embodiments of the invention has been made only by way of example, and modifications will occur to those skilled in the art. These as well as other minor variations cannot be considered as a departure from the essence of the invention as defined in the appended claims.

The present application is in part a continuation of application Serial No. 681,466, filed September 3, 1957.

What is claimed is:

1. A pretreatment method for improving the cementing qualities of a rubber surface in which the rubber is selected from the class consisting of natural rubber, butyl rubber and neoprene rubber, the method being characterized by the application to said surface of a mixture of a major amount of xylol and minor amounts of carbon tetrachloride, carbon disulfide and 1,1,1-trichloroethane, and evaporating off substantially all of the applied mixture.

2. A composition for pretreating rubber surfaces to be cemented to other rubber surfaces, which composition consists essentially of a major amount of xylol and minor amounts of carbon tetrachloride, carbon disulfide and 1,1,1-trichloroethane.

3. A composition for pretreating rubber surfaces to be cemented to other rubber surfaces, which composition consists essentially of about 80% xylol, 18% carbon tetrachloride, 0.5% carbon disulfide, and 1.5% 1,1,1-trichloroethane, all percentages being by weight.

4. A pretreatment method for improving the cementing qualities of a rubber surface in which the rubber is selected from the class consisting of natural rubber, butyl rubber and neoprene rubber, the method being characterized by the application to said surface of a mixture of a major amount of xylol, a minor amount of at least one chlorinated hydrocarbon selected from the class of carbon tetrachloride and 1,1,1-trichloroethane, and about ¼ to 1% carbon disulfide by weight, and evaporating off substantially all of the applied mixture.

5. A method for patching tubeless tires, said method being characterized by the steps of applying to the internal surface of the tire a mixture of a major amount of xylol, a minor amount of at least one chlorinated hydrocarbon selected from the class of carbon tetrachloride and 1,1,1-trichloroethane, and about ¼ to 1% carbon disulfide by weight, evaporating off substantially all of the applied mixture, and then applying a patch to the so-treated surface.

6. A method for patching a tire tube, said method being characterized by the steps of applying to the surface of the tube a mixture of a major amount of xylol, a minor amount of at least one chlorinated hydrocarbon selected from the class of carbon tetrachloride and 1,1,1-trichloroethane, and about ¼ to 1% carbon disulfide by weight, evaporating off substantially all of the applied mixture, and then applying a patch to the so-treated surface.

7. A composition for improving the cementing characteristics of a rubber surface, said composition consisting essentially of a major amount of xylol, a minor amount of at least one chlorinated hydrocarbon selected from the class of carbon tetrachloride and 1,1,1-trichloroethane, and about ¼ to 1% carbon disulfide by weight.

References Cited in the file of this patent

UNITED STATES PATENTS

| | | |
|---|---|---|
| 1,489,477 | Bowes et al. | Apr. 8, 1924 |
| 2,101,607 | Block | Dec. 7, 1937 |
| 2,400,129 | Nelson | May 14, 1946 |
| 2,430,076 | Pollock | Nov. 4, 1947 |
| 2,467,789 | Verbanc | Apr. 19, 1949 |
| 2,522,776 | Busse | Sept. 19, 1950 |

OTHER REFERENCES

Handbook of Solvents, Scheflan & Jacobs, 1953, pages 192, 193, 661, 662 and 665.